Oct. 17, 1967 G. GOLUB 3,347,210
SUPPORT FOR GROWING OYSTERS
Filed Jan. 5, 1966
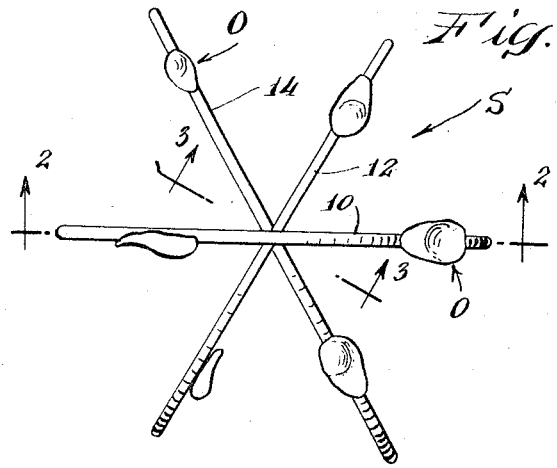
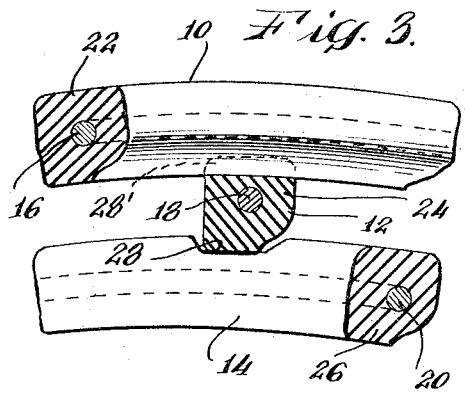
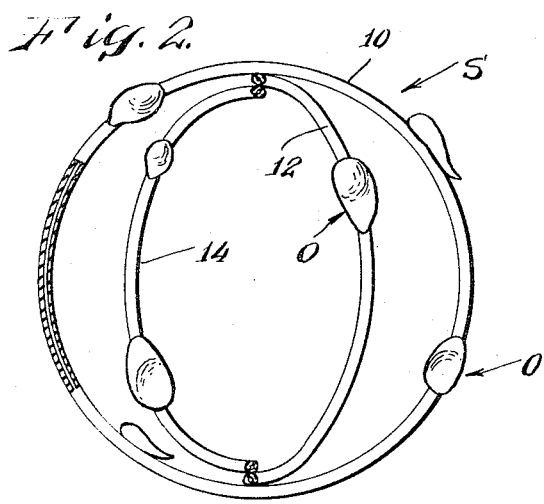
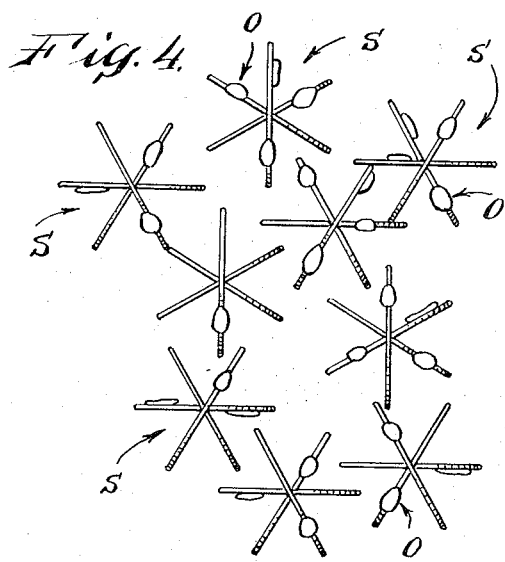
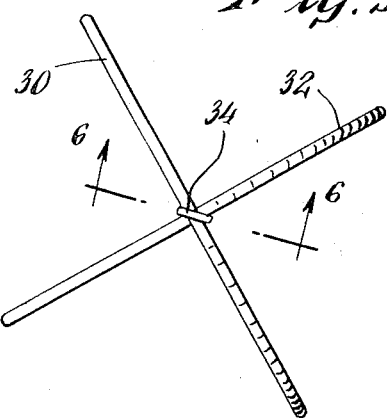
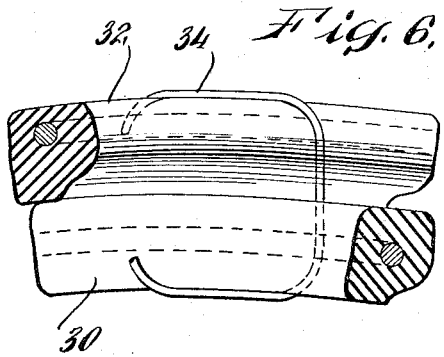
INVENTOR.
Gerald Golub
BY
Wooster, Davis & Cifelli
ATTORNEYS.

United States Patent Office

3,347,210
Patented Oct. 17, 1967

3,347,210
SUPPORT FOR GROWING OYSTERS
Gerald Golub, Orlando, Fla., assignor to AG-Heat Systems, Inc., Orlando, Fla., a corporation of Florida
Filed Jan. 5, 1966, Ser. No. 518,919
7 Claims. (Cl. 119—4)

ABSTRACT OF THE DISCLOSURE

A support for growing oysters above the bed of a body of water. A plurality of resilient rings having surfaces suitable for the attachment of oyster spat are intermeshed in the form of a skeletonized sphere.

---

This invention relates to an improved support for the growth of oysters.

Oyster spat require a surface on which to set and grow. Each oyster has only one chance to find a suitable surface and if they do not do so, they will set on the mud or sand bottom and die. The usual practice in preparing oyster beds is to deposit prepared oyster shell on the bottom. Clam shells are better for this purpose because they provide a better set per acre and the oysters grow faster and more uniformly. However, oyster shell is more commonly used because it is cheaper and more readily available. A still better practice is to use vehicle tire parts or wire mesh suspended above the bottom. Poles, rails, or racks are normally used to support these parts, and the usual practice is to set the oyster spat thereon in a laboratory before placing them in the water. It has been found that oysters growing above the bottom thrive and grow to a greater extent than do those on the actual bottom.

It will be obvious to those skilled in the art that the installation of suspended tire parts or wire mesh is difficult, time consuming, and expensive. The necessary structure takes up considerable space on the boat which transports them to the oyster beds and, thereafter, they must be properly erected on the bottom. In addition, it is difficult to harvest oysters from them. Many of the parts corrode in the salt water environment and the surface available for oysters is limited.

Accordingly, it is a primary object of this invention to provide an improved support for setting and growing oysters. Other objects are to provide such a support which takes up little room in transportation; which is noncorrosive; which is easily assembled and placed on the bottom; and which is easily lifted from the bottom for harvesting. Other objects, features and advantages will be apparent from the following description, the appended claims and the figures of the attached drawing, wherein:

FIG. 1 is a plan view of a structure in accordance with this invention;

FIG. 2 is a cross section taken substantially along the line 2—2 of FIG. 1;

FIG. 3 is an enlarged cross section taken substantially along the line 3—3 of FIG. 1;

FIG. 4 is a plan view of a number of the supports of this invention as they would be disposed on the oyster bed;

FIG. 5 is a plan view of a modified support in accordance with this invention; and FIG. 6 is an enlarged cross section taken substantially along the line 6—6 of FIG. 5.

The objects of this invention are achieved by providing a support for growing oysters which comprises a plurality of intermeshed rings, each of the rings lying in a substantially different plane from any other ring.

The rings which are employed in the support of this invention are preferably resilient and noncorrosive. Although rings of many different kinds may be suitable for this invention, those which have been found particularly well adapted consist of the bead portions of motor vehicle tires. The beads of most tires include a metal strip embedded therein which provides both resiliency and rigidity. The strip is covered with the rubber portion of the tire which protects the metal from corrosion.

With particular reference to the drawings, there is illustrated in FIG. 1 an oyster support S comprising three rings 10, 12, 14, each of which comprises the bead portion of a vehicle tire. As is illustrated clearly in the cross section of FIG. 3, each ring comprises an inner metal strip 16, 18, 20, respectively, enclosed within the usual rubber tire material 22, 24, 26. The support is assembled by diametrically compressing the ring 12 and inserting it within the ring 10. The ring 14 is similarly compressed and inserted in ring 12. In this manner, the illustrated structure is formed.

In order to prevent the rings from disengaging, the rubber material may be notched as shown at 28, 28' FIG. 3, in order that each ring will be more positively indexed with an associated ring. It will be readily apparent that the support S, which is thus formed, is essentially spherical or oblate so that, even when it is dropped to the bottom from a surface boat, it will rest with most of its surface above the bottom. A number of similar supports may be used to blanket a bottom area, as shown in FIG. 4. The oysters O which adhere to the rings will thus be supported above the bottom surface in an environment most conducive to their growth and development.

A variation of this invention is illustrated in FIGS. 5 and 6, wherein the support is formed from only two rings 30, 32. Furthermore, the rings are unnotched and are secured together by means of a clip 34 which may be of metal or plastic. It will be apparent, of course, that other means may be used for securing the rings together if desired. It will also be apparent that the number of rings used in each support is not critical.

The support of this invention has a number of advantages over prior art supports. For example, the amount of surface available for setting the oyster spat can be varied on each ring, depending upon how much coating or covering of rubber or other material the rings have. Furthermore, the invention makes good use of otherwise scrapped tire beads which are available from various tire de-beading operations. Whole tires would be unacceptable because of their excessive weight when filled with water, sand, mud, barnacles and oysters. Also, the size of the rings is not criticial, as they are flexible enough to be meshed together, even when derived from tires of substantially different sizes. In general, it is advisable to place the larger diameter rings inside the smaller ones.

The density of rings on the bottom will vary. A typical requirement would be for 5000–35,000 two-ring supports per acre varying, of course, with how close together the supports are placed, and also with the ring size and the number of rings used in each support.

Many other advantages will also be apparent. For example, the rings are usually stored in their separated condition so as to take up very little room while being transported on a boat. The supports may then be easily assembled prior to being placed in the water. It will also be apparent that it is quite simple to bring the supports of this invention aboard a boat, using, for example, a grapnel hook or similar device. The oysters may be easily sorted from the rings, and any undersized oysters may be left on the supports and placed back into the water for further growth. This contrasts sharply with the difficulties of harvesting oysters grown on oyster shell, wherein it is necessary to bring all the shell aboard a fishing boat and then sort out the oyster from the shell.

Many other variations and modifications of this invention will be apparent to those skilled in the art. Accordingly, the foregoing description is intended to be construed as illustrative only, rather than limiting. This invention is limited only by the scope of the following claims.

What I claim as new and desire to secure by Letters Patent of the United States is:

1. A support for growing oysters which comprises: a plurality of contacting intermeshed rings, each of said rings having a surface suitable for the attachment of oyster spat and lying in a substantially different plane from any other ring to form a skeletonized sphere.

2. The support of claim 1 wherein each of said rings is the bead portion of a vehicular tire.

3. The support of claim 1 wherein said rings are readily separable from one another.

4. The support of claim 1 wherein said rings are retained in their intermeshed position by means of a clip.

5. The support of claim 1 wherein said rings are resilient and include a metal strip embedded therein.

6. A support for growing oysters which comprises: a plurality of resilient intermeshed rings, each of said rings lying in a substantially different plane from any other ring, at least one of said rings being diametrically compressed to fit within another of said rings.

7. The support of claim 6 wherein one of said rings is notched to receive the other of said rings.

References Cited

UNITED STATES PATENTS

| D. 115,427 | 6/1939 | Schepps | 119—17 |
| 2,922,393 | 1/1960 | Munz | 119—17 |
| 3,029,785 | 4/1962 | Maheo | 119—4 |
| 3,294,061 | 12/1966 | Hanks | 119—4 |

FOREIGN PATENTS 90,628  12/1957  Norway.

OTHER REFERENCES

Washington Herald, Picture, page 19, July 14, 1933.

ALDRICH F. MEDBERY, *Primary Examiner.*